United States Patent
Shinohara et al.

(10) Patent No.: US 7,385,632 B2
(45) Date of Patent: Jun. 10, 2008

(54) LENS, CAMERA BODY AND CAMERA SYSTEM

(75) Inventors: Mitsuru Shinohara, Utsunomiya (JP); Tohru Kawai, Kawasaki (JP); Masanori Ishikawa, Saitama (JP); Seiichi Kashiwaba, Utsunomiya (JP); Shigeki Sato, Utsunomiya (JP); Yuki Nagao, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 648 days.

(21) Appl. No.: 11/032,291

(22) Filed: Jan. 10, 2005

(65) Prior Publication Data

US 2005/0168581 A1 Aug. 4, 2005

(30) Foreign Application Priority Data

Jan. 30, 2004 (JP) ............................. 2004-022744

(51) Int. Cl.
*H04N 5/228* (2006.01)
(52) U.S. Cl. ............................... 348/208.5; 348/208.16
(58) Field of Classification Search ............. 348/208.5, 348/208.8, 208.11, 208.16, 240.1
See application file for complete search history.

(56) References Cited

U.S. PATENT DOCUMENTS

| | | | | |
|---|---|---|---|---|
| 5,608,703 A * | 3/1997 | Washisu | ................... | 348/208.7 |
| 5,657,080 A * | 8/1997 | Sekine | ..................... | 348/208.5 |
| 5,867,213 A * | 2/1999 | Ouchi | ..................... | 348/208.5 |
| 5,982,421 A * | 11/1999 | Inou et al. | ............... | 348/208.5 |
| 6,510,283 B1 * | 1/2003 | Yamagishi | ................... | 396/55 |
| 2001/0022619 A1 * | 9/2001 | Nishiwaki | ................... | 348/208 |
| 2005/0140793 A1 * | 6/2005 | Kojima et al. | ......... | 348/208.99 |
| 2006/0110147 A1 * | 5/2006 | Tomita et al. | ................ | 396/55 |

* cited by examiner

*Primary Examiner*—Tuan Ho
*Assistant Examiner*—Dennis Hogue
(74) *Attorney, Agent, or Firm*—Cowan, Liebowitz & Latman, P.C.

(57) ABSTRACT

A camera system has a recording portion for recording an object image, a display portion for displaying an object image, a first blur correction portion for correcting blur of the object image displayed on the display portion by signal processing, and a second blur correction portion for optically correcting blur of the object image recorded by the recording portion. The camera system includes a controller for switching between a first blur correction mode in which the first blur correction portion is operated, a second blur correction mode in which the second blur correction portion is operated and a third blur correction mode in which both the first blur correction portion and the second blur correction portion are operated.

10 Claims, 6 Drawing Sheets

LENS, CAMERA BODY AND CAMERA SYSTEM

BACKGROUND OF THE INVENTION

1. Field of the Invention

The present invention relates to a lens, a camera body and a camera system. The present invention is particularly suitable for optical apparatuses, such as film cameras, video cameras and digital cameras, provided with a blur correction function (or vibration prevention function) with which image blur caused by hand vibration of the photographer can be corrected.

2. Related Background Art

Heretofore, many image pickup apparatuses, such as video cameras and film cameras, provided with a blur correction function for preventing deterioration of picked up images (i.e. image blur) caused by hand vibration of the photographer upon shooting have been offered in the market.

The blur correction function used in these image pickup apparatuses is roughly classified into a so-called electrical blur correction system and an optical blur correction system. In the electrical blur correction system, an image signal generated by an image pickup element such as a CCD is picked up, and the image area to be displayed is changed in accordance with the vibration of the camera to display an image without blur. In the optical blur correction system, vibration is detected by a sensor such as a vibration gyro, and the apex angle of a variable apex-angle prism is changed or a part of the image pickup lens is shifted based on the detection result to prevent blur of the picked up image on the image pickup surface.

Here, the outline of both the blur correction systems will be briefly described. In the electrical blur correction system, an image signal output from the image pickup optical system is electrically processed, and then the image signal is temporarily stored in a field memory. After that, the image signal of the current field output from the image pickup optical system is compared with the image signal of the preceding field stored in the field memory to determine the vibration amount, and the image read-out position is shifted as needed to correct the blur of the image. This electrical blur correction system is widely used as a vibration correction system mainly for motion image in video cameras of the like.

On the other hand, in the optical blur correction system, an angular velocity sensor for detecting vibration is provided in the body of the image pickup apparatus, and the optical axis is shifted by means of an optical axis correcting portion such as a variable prism provided in the optical path of the image pickup optical system based on an angular velocity signal obtained from the angular velocity sensor to correct vibration (or blur) of the image on the imaging surface. This system does not suffer from deterioration in picked up images involved by the correcting operation. In addition, since the optical axis angle can be corrected in accordance with the vibration angle of the camera body irrespective of the focal length, image blur can be eliminated excellently even in the case that an image pickup optical system with a long focal length is used. Thus, in terms of image quality, this system is superior to the above system. This optical blur correction system is widely used mainly for correcting image vibration in obtaining still images in film cameras or the like.

As described above, the image blur correction method used in image pickup apparatuses includes the electrical blur correction system and the optical blur correction system, each of which has advantages and disadvantages.

In the electrical blur correction system, blur correction can be achieved easily, but since a portion of image information once stored is used, resolution is deteriorated, and deterioration in image quality is sensible especially when an image of an object in which the image signal includes a large amount of high frequency components, as is the case with, for example, a fine pattern or far landscape is to be picked up.

On the other hand, in the optical blur correction system, although an excellent image can be obtained, it suffers from the problems that a gyro sensor and other parts requires a significant time for activation, and that a significant power is consumed for driving the gyro sensor and other parts. In the digital camera, a kind of the image pickup apparatus, while an object image is to be observed, it is necessary to display a motion picture on a monitor as needed in a manner similar to a video camera, while upon photographing, it is necessary to record a still image with a high image quality as with a film camera.

In view of the above situation, in some prior arts, as disclosed for example in Japanese Patent Application Laid-Open No. 2001-203930, in the recording of an object image, the blur of the object image is optically corrected using an optical blur correction system, and while an object image is displayed on display means without being recorded, the blur of the object image is corrected not optically but by image signal processing by an electrical blur correction system. Thus, power consumption in correcting the blur of the object image is made small while the image is observed before photographing, and the object image can be recorded with a high image quality when photographed.

In the technology disclosed in the above-mentioned document, when the blur correction by image signal processing (or the electrical blur correction) is switched to the blur correction by optical means (or the optical blur correction) while an image is displayed on the display means during the image pickup preparation stage, the optical blur correction means is activated after the operation of the electrical blur correction means is stopped. In addition, when the blur correction by optical means (or the optical blur correction) is switched back to the blur correction by image signal processing (or the electrical blur correction) during the image pickup preparation stage, the electrical blur correction means is activated after the operation of the optical blur correction means is stopped. Accordingly, skipping of the object image occurs upon the switching of the blur correction means, which can cause a trouble in the framing operation upon photographing.

SUMMARY OF THE INVENTION

In view of the above, an object of the present invention is to provide an interchangeable lens and a camera system using the same which enable smooth switching of the blur correction means upon changing from the blur correction by an image signal processing (or the electrical blur correction) to the blur correction by optical means (or the optical blur correction) or upon changing from blur correction by optical means to the blur correction by image processing while an image is displayed on the display means during the image pickup preparation stage to prevent skipping of the object image upon switching of the blur correction means, so that the framing operation upon photographing can be carried out in a favorable state.

According to the present invention, there is provided a lens, a camera body and a camera system having the following structures.

A camera system according to the present invention comprising a recording portion for recording an object image, a display portion for displaying the object image, a first blur correction portion for correcting blur of the object image displayed on the display portion by signal processing, a second blur correction portion for optically correcting blur of the object image recorded by the recording portion, and a controller for switching between a first blur correction mode in which the first blur correction portion is operated, a second blur correction mode in which the second blur correction portion is operated and a third blur correction mode in which both the first blur correction portion and the second blur correction portion are operated.

A lens (or interchangeable lens) according to the present invention is lens that can be detachably mounted on a camera body having a recording portion for recording the object image, a display portion for displaying an object image, a first blur correction portion for correcting blur of the object image displayed on the display portion by signal processing and a camera controller. The lens comprises a second blur correction portion for optically correcting blur of the object image recorded by the recording portion and a lens controller, wherein the camera controller can set either one of a first blur correction mode in which the first blur correction portion is operated, a second blur correction mode in which the second blur correction portion is operated and a third blur correction mode in which both the first blur correction portion and the second blur correction portion are operated, and the lens controller drives the second blur correction portion based on a signal from the camera controller.

A camera body according to the present invention is a camera body on which a lens can be detachably mounted, comprising a recording portion for recording an object image, a display portion for displaying the object image, a first blur correction portion for correcting blur of the object image displayed on the display portion by signal processing, and a controller for switching between a first blur correction mode in which the first blur correction portion is operated, a second blur correction mode in which a second blur correction portion provided in the lens for optically correcting blur of the object image recorded by the recording portion is operated and a third blur correction mode in which both the first blur correction portion and the second blur correction portion are operated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

In the following, embodiments of the present invention will be described with reference to the drawings.

First Embodiment

Figure 1:
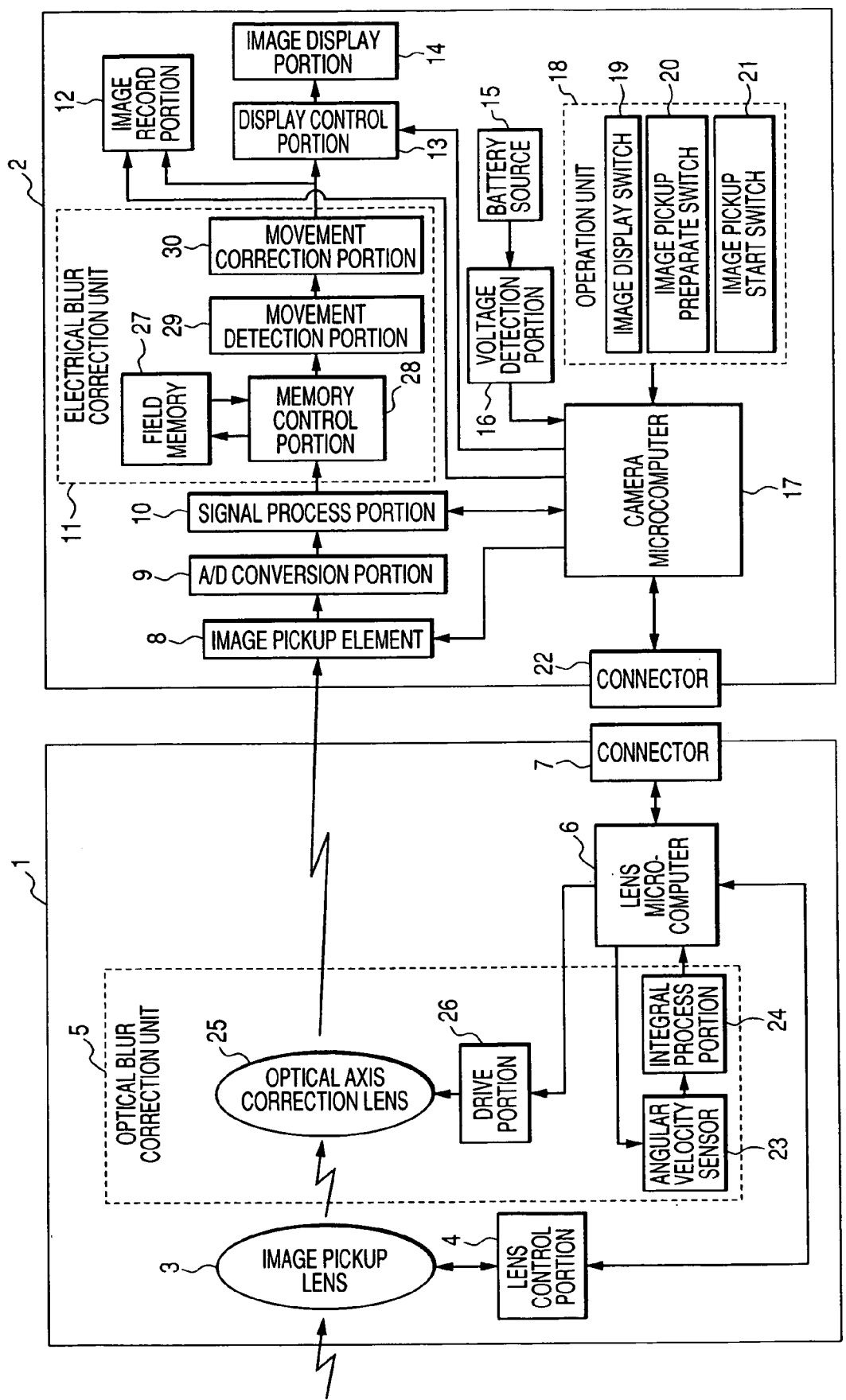
FIG. 1 is a block diagram of a camera system according to a first embodiment of the present invention.

FIG. 1 is a block diagram showing the principal portion of a camera system as the first embodiment of the present invention.

In this diagram, reference numeral 2 designates a camera body, and reference numeral 1 designates an interchangeable lens that can be mounted on the camera body 2. Reference numeral 3 designates an image pickup lens, which optically forms an image of an object to be photographed (or an object image) on a surface of an image pickup element 8 that will be described later. Reference numeral 4 designates a lens control portion, which is composed of a motor and gears for driving the image pickup lens 3 for focusing or zooming, an encoder for detecting the focus position or the zoom position (i.e. the focal length) and other parts.

Reference numeral 5 designates an optical blur correction unit serving as the second blur correction means, which includes parts that will be described later. The optical blur correction unit 5 is adapted to correct image blur at the time when vibration occurs in the picked up image (object image) due to hand vibration etc. by shifting the optical axis of the image pickup lens 3 to achieve optical correction so that the object image recorded by recording means 12 (which will be described later) will not be blurred.

Reference numeral 6 designates a lens microcomputer, which controls the operations of the interchangeable lens 1. Reference numeral 7 designates a lens connector unit having contacts for allowing the lens microcomputer 6 to communicate with a camera microcomputer 17 provided in the camera body 2.

Reference numeral 8 designates an image pickup element, which is composed of, for example, a CCD that receives light of a focused object image and converts it into an analogue signal. Reference numeral 9 designates an A/D conversion portion, which converts the image signal in the form of an analogue signal output from the image pickup element 8 into a digital signal. Reference numeral 10 designates a signal processing unit, which effects various processing on the signal converted in the A/D conversion portion 9.

Reference numeral 11 designates an electrical blur correction unit serving as the first blur correction means, which includes parts that will be described later. The electrical blur correction unit 11 is adapted to electrically correct image blur when vibration occurs in the picked up image due to hand vibration etc. so that the object image displayed on display means (or an image display portion, which will be described later) 14 will not be blurred.

Reference numeral 12 designates an image recording portion serving as the recording means. The image recording portion records the image signal representing the object image generated by the conversion in the image pickup element 8.

Reference numeral 13 designates display control portion, which modifies the image signal into a displayable form and switching the display.

Reference numeral 14 designates an image display portion serving as the display means. The image display portion 14 displays an object image based on the image signal generated by the conversion in the image pickup element 8.

Reference numeral 15 designates a power source battery for supplying electric power to various portions. Reference numeral 16 designates a voltage detection portion, which checks the voltage of the battery 15. Reference numeral 17 designates a camera microcomputer, which controls various portions of the camera body 2. Reference numeral 18 designates an operation unit, which supplies various operation commands through the camera microcomputer 17. The operation unit 18 includes an image display switch 19 for commanding the display control portion to display an image, an image pickup preparation switch 20 for commanding the lens body 1 and the camera body 2 to prepare for the image pickup operation, an image pickup start switch 21 for commanding start of the image pickup operation and other various switches (not shown).

In connection with the above, the image pickup preparation switch 20 and the image pickup start switch 21 are constructed as an integral push button switch that can be operated by a series of depressing operations of a shutter release member.

Reference numeral 22 designates a camera connector unit having contacts for allowing the camera microcomputer 17 to communicate with the lens microcomputer 6 in the lens body 1.

As will be described later, the camera microcomputer 17 in this embodiment is adapted to switching a first state in which only the first blur correction means 5 is operated, a second state in which the second blur correction means 11 is operated, and a third state, occurring in the course of switching of the first state and the second state, in which both the first blur correction means 5 and the second blur correction means 11 are operated. Particularly in the third state, the camera microcomputer 17 controls to change the ratio of the blur correction amount of the first blur correction means 5 and the blur correction amount of the second blur correction means 11 with time.

In addition, in this embodiment, the camera microcomputer 17 has discrimination means for discriminating between the state in which the recording means 12 does not record an object image and the display means 14 displays an object image and the state in which the recording means 12 records an object image. The camera microcomputer 17 is adapted to switch between the first state and the second state based on the result of the discrimination by the discrimination means.

In this embodiment, the camera microcomputer 17 inputs a blur correction signal from the first blur correction means 11 to the lens microcomputer 6, and the lens microcomputer 5 controls the second blur correction means 5 in the interchangeable lens 1.

Next, the structure of the optical blur correction unit (the second blur correction means) 5 in this embodiment will be described.

In FIG. 1, reference numeral 23 designates an angular velocity sensor, which detects the angular velocity of the vertical vibration and the angular velocity of the horizontal vibration. Reference numeral 24 designates an integral process portion, which integrates the signal output from the angular velocity sensor 23 and A/D-converting it to output a vibration angular displacement amount signal to the lens microcomputer 6. Reference numeral 25 designates an optical axis correction element (composed, for example, of an optical axis correction lens or a variable apex-angle prism) provided in the optical path of the image pickup lens 1. Reference numeral 26 designates a drive portion adapted to drive the optical axis correction element 25 based on an output from the lens microcomputer 6 to shift the optical axis of the image pickup lens 3 in the vertical and horizontal directions, thereby correcting blur of the object image on the image pickup element 8.

Next, the structure of the electrical blur correction unit (the first blur correction means) 11 in this embodiment will be described.

In FIG. 1, reference numeral 28 designates a memory control portion, which controls input/output of the digital signal supplied from the signal processing portion 10 to/from a movement detection portion 29 and a field memory 27. The movement detection portion 29 compares the signal of the current field output from the signal processing portion 10 and the signal of the preceding field stores in the field memory 27 to determine the movement amount relative to the preceding field. Reference numeral 30 designates a movement correction portion, which shifts, based on information from the movement detection portion 29, the image readout position as needed so as to cancel the movement amount. In this connection, while not performing the blur correction, the electric blur correction unit 11 is adapted to output the input signal directly without any modification.

Figure 2:
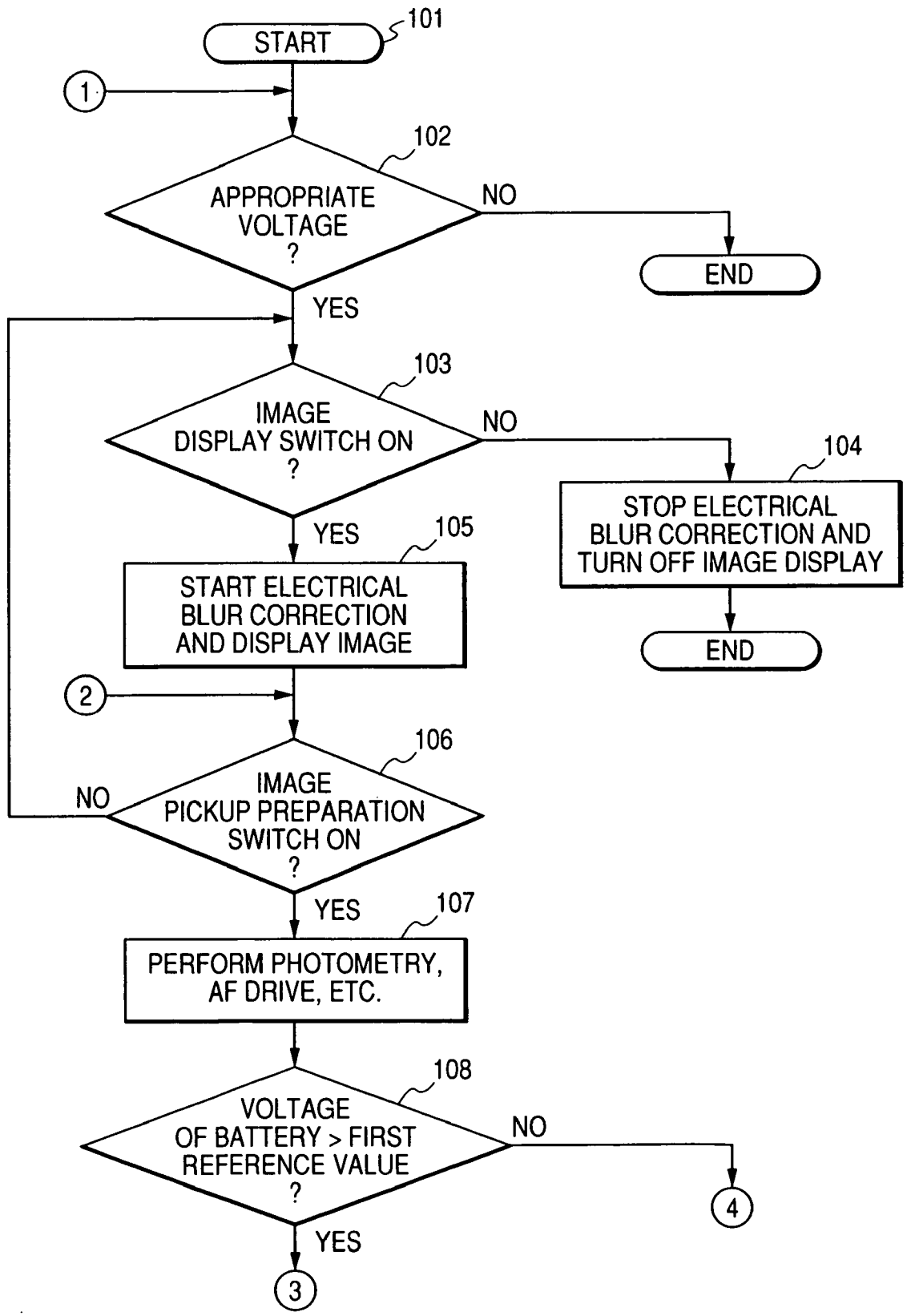
FIG. 2 is a flow chart of an operation of the camera system according to the first embodiment.
Figure 3:
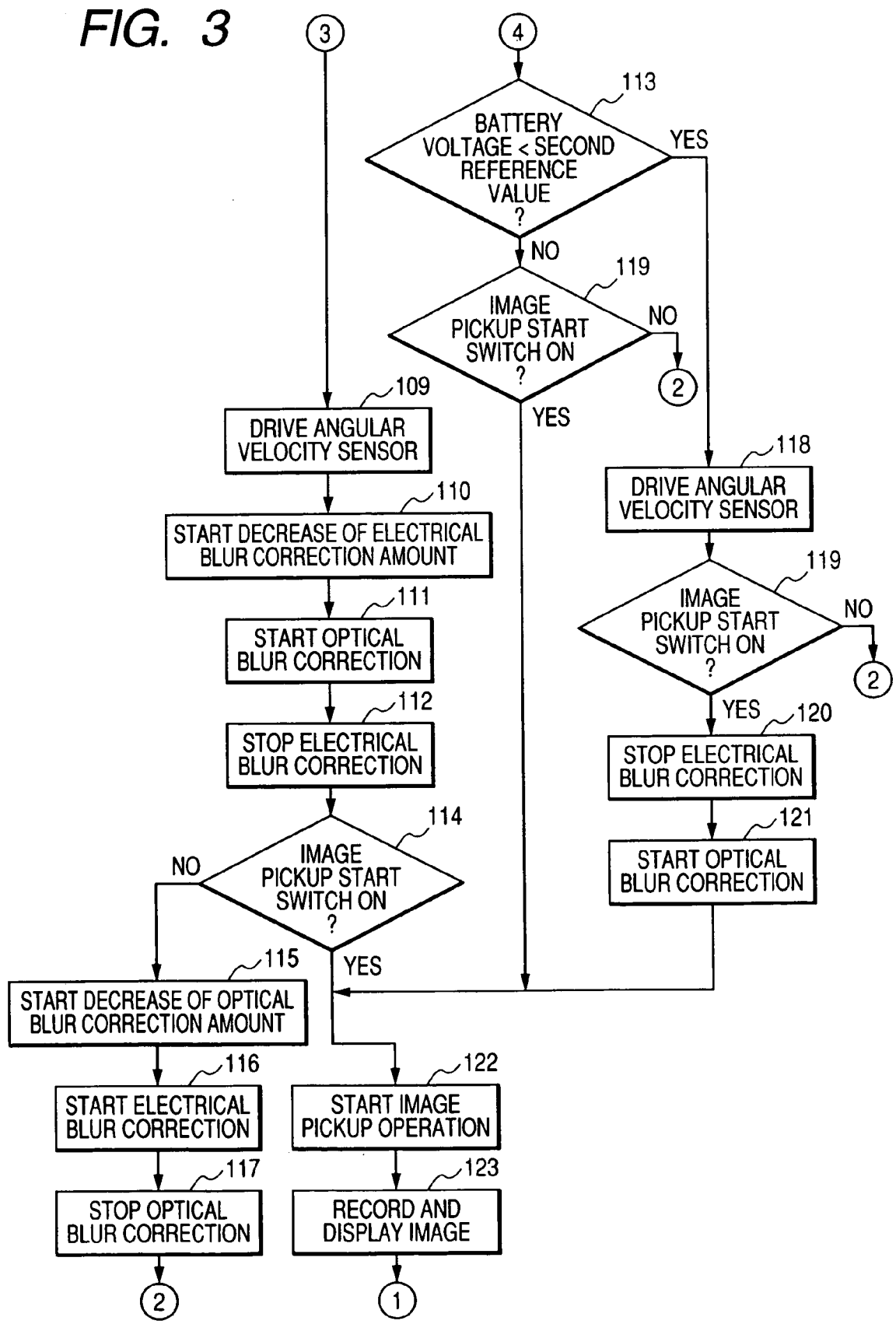
FIG. 3 is a flow chart of the operation of the camera system according to the first embodiment.

In the following, the operation of the camera system having the above-described structure will be described with reference to the flow charts presented as FIGS. 2 and 3.

Firstly, when the power of the camera body 2 is turned on by operation of the operation unit (step 101), the camera microcomputer 17 checks the voltage of the battery 15 by means of the voltage detection portion 16 to make determination as to whether or not the voltage is an appropriate voltage for operating the camera body 2 and the lens body 1 (step 2). When it is determined that the voltage is not appropriate, the power is turned off to terminate the process.

When it is determined that the voltage is appropriate, it is checked whether the image display switch 19 has been operated or not (step 103). If the image display switch 19 has been operated, an image signal is first fetched from the image pickup element 8. The fetched image signal is subjected to blur correction in the electrical blur correction unit 11, and the image that has undergone blur correction processing is displayed on the image display portion 14 (step 105). In the case that the image display switch has not been operated in step 103, the blur correction by the electrical blur correction unit 11 is stopped, and image display on the image display portion 14 is turned off (step 104). After that, the power is turned off after a predetermined time to terminate the process.

Next, it is checked whether image pickup preparation switch 20 has been operated or not (step 106), and if the image pickup preparation switch 20 has not been operated, the process returns to step 103 to enter a waiting state in which the above-described process is repeatedly executed. If the image pickup preparation switch 20 has been operated, image pickup preparation control operations, such as photometry or AF (auto focus) drive, are performed (step 107). After that, it is checked whether or not the voltage of the battery 15 is higher than a first reference voltage sufficient for performing optical blur correction (step 108).

If the voltage is higher than the first reference value, the angular velocity sensor 23 is firstly driven (step 109), and the integral process portion 24 is operated to detect vibration in the vertical and horizontal directions occurring in the lens body 1 and the camera body 2. Then, decrease of the electrical blur correction amount relative to the overall blur correction amount required for blur correction of the object image is started (step 110). Simultaneously, the optical axis correction element 25 is driven by means of the drive portion 26 to shift the optical axis of the image pickup lens 3 in the vertical and horizontal directions, whereby correction is effected to fill the deficit of the electrical blur correction amount achieved relative to the overall blur correction amount required for blur correction of the object image on the image pickup element 8 (step 111). In this process, the electrical blur correction amount is decreased with time, and the optical blur correction amount is increased so as to fill the changing deficit of the electrical blur correction amount accordingly. At the time when the electrical blur correction amount becomes 0, the operation of the electrical blur correction unit 11 is stopped (step 112).

Then, the process is in a waiting state for a predetermined time until the image pickup start switch 12 is operated (step 114). In connection with this, the image pickup start switch 21 can be operated simply by a further depression subsequent to a depression of the image pickup preparation switch 20. Therefore the operation can be performed easily, and the image pickup can be started promptly after the completion of the image pickup preparation. If the image pickup switch 21 is not operated within the predetermined time, decrease of the optical blur correction amount relative to the overall blur correction amount required for blur correction of the object image is started (step 115). Simultaneously, the electrical blur correction is started to fill the deficit of the optical blur correction amount achieved relative to the overall blur correction amount required for blur correction of the object image on the image pickup element 8 (step 116). In this process, the optical blur correction amount is with time, and the electrical blur correction amount is increased so as to fill the changing deficit of the optical blur correction amount accordingly. At the time when the optical blur correction amount becomes 0, the operation of the optical blur correction unit 5 is stopped (step 117), and the process returns to step 106.

On the other hand, if the image pickup start switch 21 is operated within the predetermined time, the camera microcomputer 17 controls the image pickup element 8 and drives the shutter (not shown) and other portions to effect the image pickup operation (step 122). In doing so, based on the result of the aforementioned voltage test (i.e. step 108), when the voltage of the battery 15 is higher than the first reference value sufficient for performing the optical blur correction operation, blur correction realizing higher image quality is effected by the optical blur correction during the image pickup operation.

After completion of the image pickup operation, an image signal is recorded in the image recording portion 12, and the image corresponding to the image signal is displayed on the image display portion 14 by means of the display control portion 13 (step 123). Then, the process returns to step 102. Thus, it is possible to check the effect of the blur correction operation just after the shooting.

If the voltage of the battery 15 is lower than the first reference value in step 108, it is checked whether or not the voltage of the battery 15 is lower than a second reference value, which represents the minimum value required for performing the optical blur correction (step 113). If the voltage of the battery 15 is lower than the second reference value, since the optical blur correction cannot be performed, it is determined that a series of blur correction operations are to be performed by the electrical blur correction, and the process is in a waiting state for a predetermined time until the image pickup start switch 21 is operated (step 119). If the image pickup start switch 21 is not operated within the predetermined time, the process returns to step 106.

On the other hand, if the image pickup start switch 21 is operated within the predetermined time, the process of step 122 and step 123 is executed.

Next, the process executed in the case that the voltage of the battery 15 is higher than or equal to the second reference value in step 113 will be described. This case corresponds to the situation that the battery has been consumed to some extent but the optical blur correction is still possible.

In this case, in the optical blur correction operation, the angular velocity sensor 23 that requires a significant detection preparation time and the integral process portion 24 are firstly operated to start only detection of the vibration in the vertical and horizontal directions occurring in the lens body 1 and the camera body 2 (step 118). Then, the process is in a waiting state for a predetermined time until the image pickup start switch 21 is operated (step 119). If the image pickup start switch 21 is not operated within the predetermined time, the process returns to step 106.

On the other hand, if the image pickup start switch 21 is operated within the predetermined time, the electrical blur correction operation is stopped (step 120). Simultaneously, the optical axis correction element 25 is driven by means of the drive portion 26 to drive the optical axis of the image pickup lens 3 in the vertical and horizontal directions, thereby correcting blur of the object image on the image pickup element 8 (step 121). After that, the process of step 122 and step 123 is executed.

As per the above, by activating only the minimum required vibration detection operation in the image pickup preparation stage, power consumption can be reduced and when the image pickup is started, the image pickup operation with the optical blur correction can be effected promptly. In this case, the electrical blur correction operation is stopped and the optical blur correction operation is started after the image pickup start switch 21 is operated, which is a situation in which framing is not to be performed. Therefore, shift of the electrical blur correction amount before stopping the electrical blur correction operation is not effected.

Figure 4:
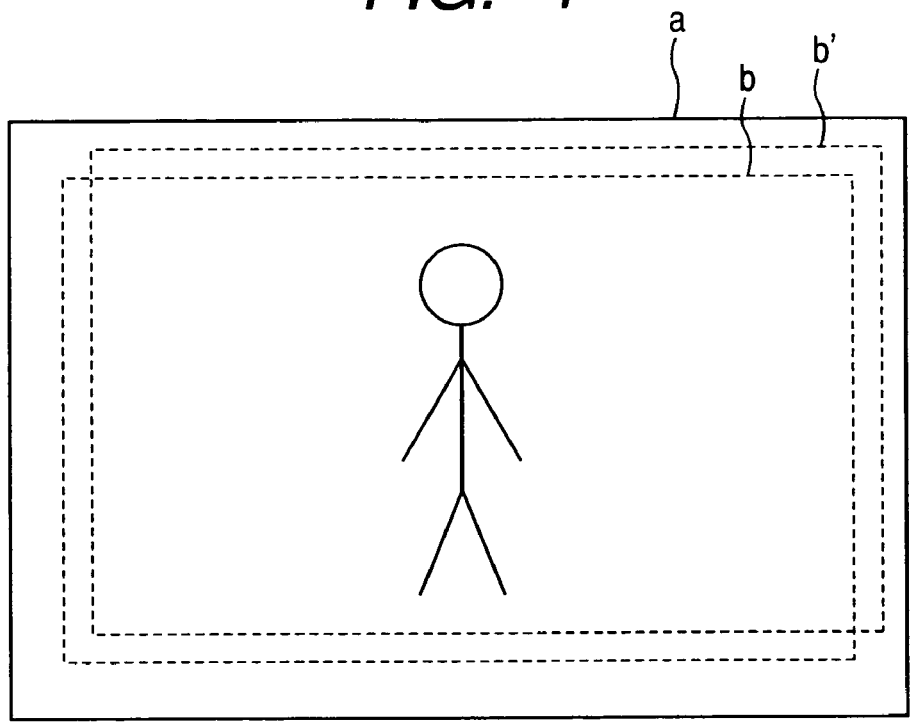
FIG. 4 is a diagram for illustrating the details of electrical blur correction.
Figure 5:
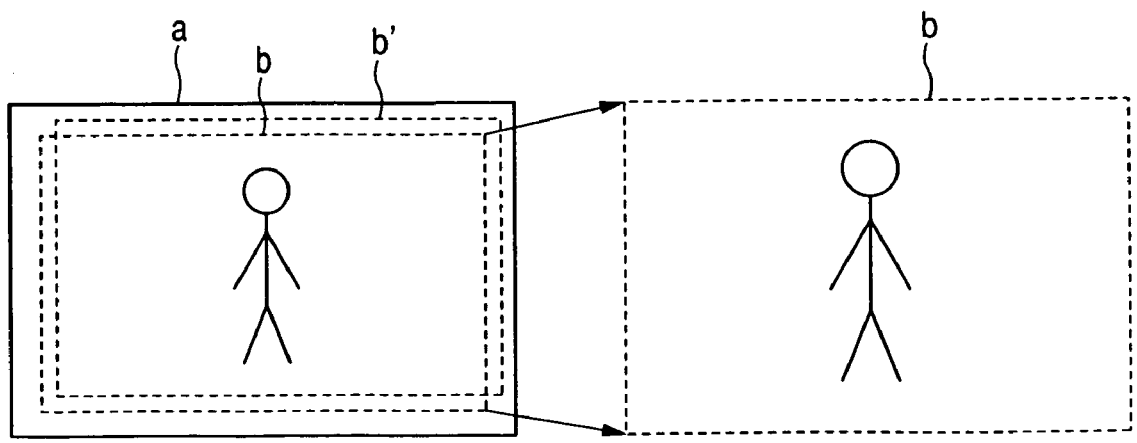
FIG. 5 is a diagram for illustrating the details of electrical blur correction.

Next, the details of the electrical blur correction will be described with reference to FIGS. 4 and 5.

Firstly, the image signal sent from the image processing portion 10 is controlled by the memory control portion 28 and temporarily stored in the field memory 27. In FIGS. 4 and 5, designated by reference character "a" is the image area that the image pickup element 8 can pick up. Designated by reference character "b" is the image read out from the field memory 27, which is the area obtained by abstracting only the central portion of the image pickup area while discarding the peripheral portion. In this way, the operation of temporarily storing the whole of the image area and abstracting a part thereof is performed repeatedly, and the moving amount of the picked up image in the vertical and horizontal directions is obtained based on the correlation of the stored image information and the image information of the next frame. The image abstraction area b' is shifted in accordance with this moving amount to realize image blur correction process. The image thus obtained is displayed on the image display portion 14.

As per the above, in this embodiment, when the image recording portion 12 does not record the image signal output from the signal processing portion 10, the image signal corrected by the electrical blur correction unit 11 is displayed on the image display portion 14, and when the image recording portion 12 records the image signal output from the signal processing portion 10, the image signal obtained by correcting the optical axis of the image pickup lens 3 by the optical axis correction element 25 is recorded by the image recording portion 12.

Furthermore, in this embodiment, there is provided a state (the third state) in which both the first blur correction means (object image blur correction by image signal processing) for the time when the image pickup operation is not effected (i.e. when the image is only observed through the finder) and the second blur correction means (object image blur correction by optical means) for the time when the image pickup operation is effected are operated simultaneously for blur correction, and the ratio of the respective blur correction amounts is changed with time by the control means (i.e. the camera microcomputer 17 and the lens microcomputer 6). With this feature, in the time when the object is not photographed but only observed, the electrical blur correction in which power consumption is small can be performed, and in the time when image pickup is effected, the optical blur correction with which an image with higher image quality can be produced can be performed. Furthermore, it is possible to eliminate disadvantages such as image skip at the time when the object image blur correction by image signal processing is switched to the object image blur correction by optical means and when the object image blur correction by optical means is switched to the object image blur correction by image signal processing.

Second Embodiment

Figure 6:
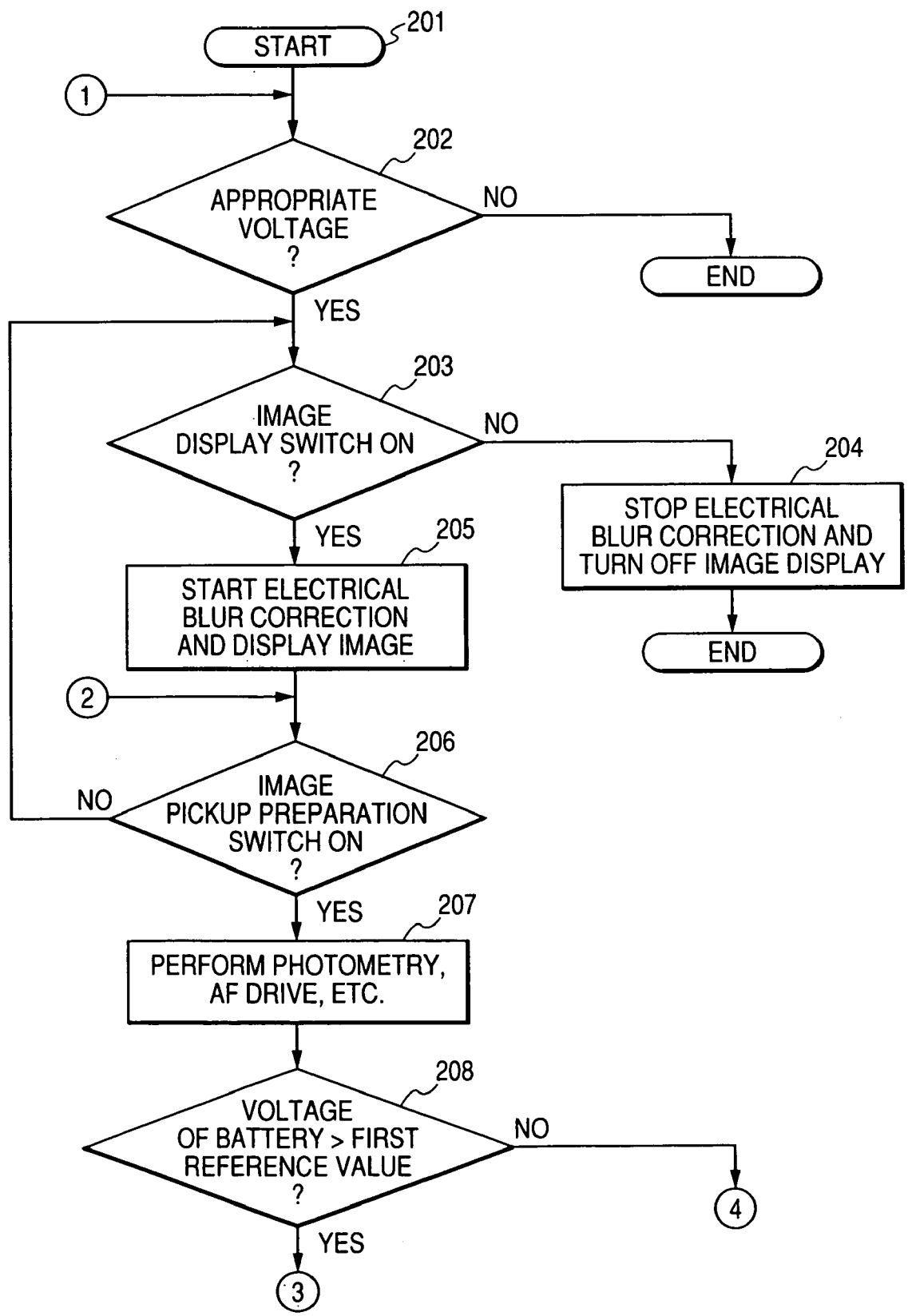
FIG. 6 is a flow chart of an operation of the camera system according to a second embodiment.
Figure 7:
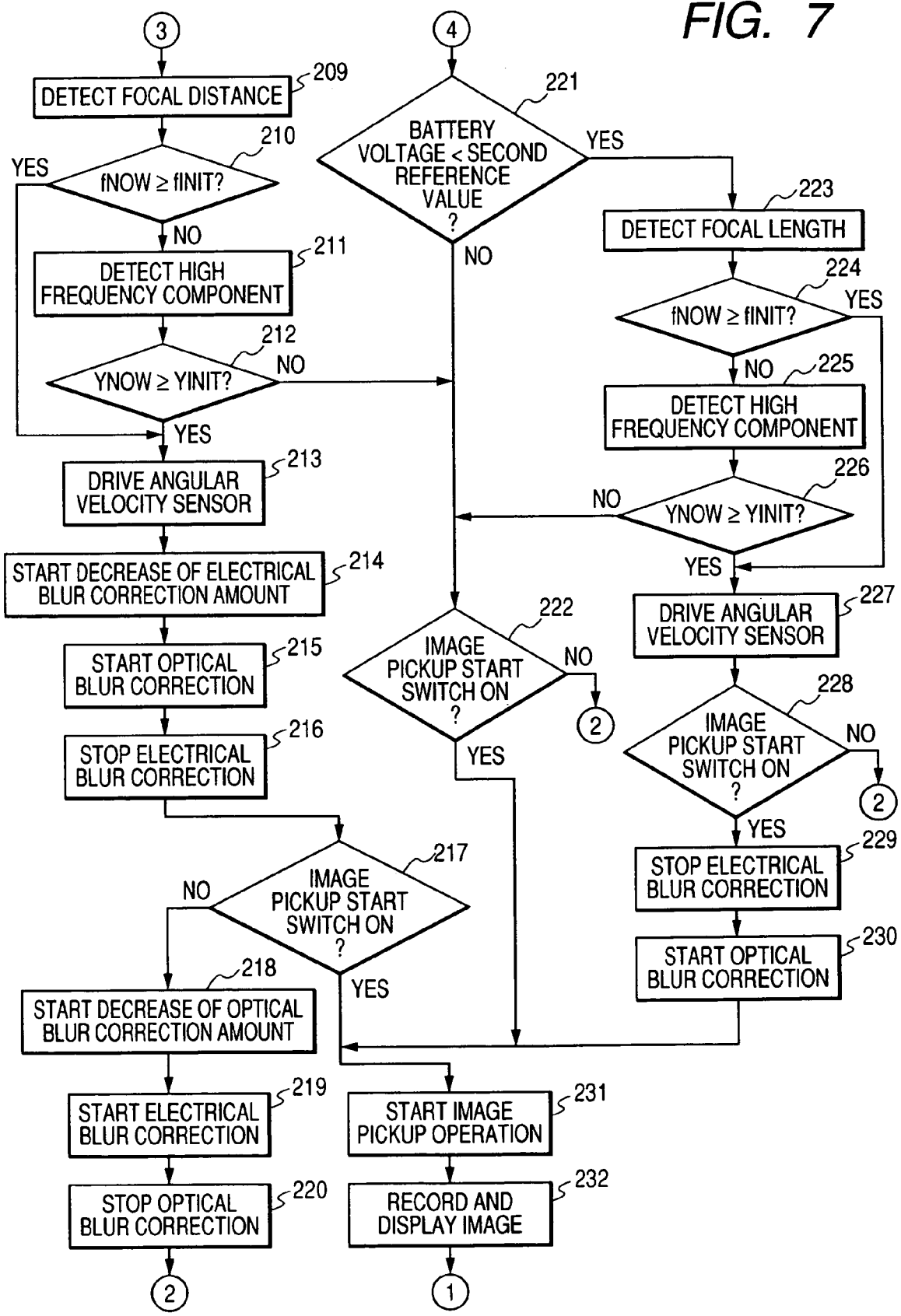
FIG. 7 is a flow chart of the operation of the camera system according to a second embodiment.

Next, the second embodiment of the present invention will be described with reference to the flow charts presented as FIGS. 6 and 7.

In this second embodiment, what is different from the above-described first embodiment is that in determining the condition for selecting the second blur correction means (i.e. the optical blur correction unit) upon picking up image, the focal length detected by focal length detection means included in the lens control portion 4 and the value of the high frequency component of the image detected by high frequency component detection means included in the camera microcomputer 17 are taken into consideration. The other structures and the optical operations are substantially the same as the first embodiment, and the similar advantageous effects are realized.

Specifically, in this embodiment, the control means (i.e. the camera microcomputer 17 and the lens microcomputer 6) is adapted to switch between the first state and the second state based on the result of discrimination, made by the discrimination means, of the state in which an object image is to be displayed on the display means 14 while the object image is not recorded by the recording means 12 and the state in which the object image is recorded by the recording means 12, the focal length detected by the focal length detection means and the value of the high frequency component of the image detected by the high frequency component detection means.

In connection with the above, although the focal length detection means is incorporated in the lens control portion 4 of the interchangeable lens 1 in this embodiment, it may be separately provided as an independent unit. In addition, although the high frequency component detection means is incorporated in the camera microcomputer 17 in the camera body, it may be separately provided as an independent unit.

The block diagram of the camera system of this embodiment is the same as that of the above-described first embodiment shown in FIG. 1. In the flow chart presented as FIGS. 6 and 7, steps 201 to 208 in FIG. 6 is the same as the process in the first embodiment (i.e. steps 101 to 108 in FIG. 2), and so the description thereof will be omitted.

In this embodiment, after the process of steps 201 to 208 is executed in a similar manner as in the first embodiment, if the voltage of the battery 15 is larger than the first reference value sufficient for performing optical blur correction, the current focal length (fNOW) of the image pickup lens 3 is firstly detected by the focal length detection means in the lens control portion 4 (step 209).

Next, the aforementioned current focal length (fNOW) and a predetermined focal length (fINIT) are compared to make determination as to whether the current focal length (fNOW) is in the wide angle side (i.e. the longer focal length side) or in the telephoto side (i.e. the shorter focal length side) of the predetermined focal length (fINIT) (step 210). That is, it is determined whether the current focal length is longer or shorter than a predetermined focal length. If, for example, fNOW<fINIT, namely if it is determined that the current focal length (fNOW) is in the wide angle side of the predetermined focal length (fINT), the value of the high frequency component of the current image signal (YNOW) is extracted by the high frequency component detection means (step 211).

Then, the value of the high frequency component in the current image signal (YNOW) is compared with a predetermined threshold value (YINIT) (step 212). If it is determined YNOW≧YINIT, the process proceeds to step 213. In addition, in the case that it is determined in step 210 that fNOW≧fINI, namely, in the case that it is determined that the current focal length (fNOW) is in the telephoto side of the predetermined focal length (fINIT), the process also proceeds to step 213.

In step 213, the angular velocity sensor 23 is activated and the integral process portion 24 is operated to detect the vibration in the vertical and horizontal directions occurring in the lens body 1 and the camera body 2. Then, shift of the electrical blur correction amount in such a direction as to be decreased relative to the overall blur correction amount required for blur correction of the object image is started (step 214). Simultaneously, the optical axis correction element 25 is driven by means of the drive portion 26 to shift the optical axis of the image pickup lens 3 in the vertical and horizontal directions, whereby correction is effected to fill the deficit of the electrical blur correction amount achieved relative to the overall blur correction amount required for blur correction of the object image on the image pickup element 8 (step 215). In this process, the electrical blur correction amount is shifted in the decreasing direction with time, and the optical blur correction amount is increased so as to fill the changing deficit of the electrical blur correction amount accordingly. At the time when the electrical blur correction amount becomes 0, the operation of the electrical blur correction unit 11 is stopped (step 216).

Then, the process is in a waiting state for a predetermined time until the image pickup start switch 12 is operated (step 217). In connection with this, the image pickup start switch 21 can be operated simply by a further depression subsequent to a depression of the image pickup preparation switch 20. Therefore the operation can be performed easily, and the image pickup can be started promptly after the completion of the image pickup preparation. If the image pickup switch 21 is not operated within the predetermined time, decrease of the optical blur correction amount relative to the overall blur correction amount required for blur correction of the object image is started (step 218). Simultaneously, the electrical blur correction is started to fill the deficit of the optical blur correction amount achieved relative to the overall blur correction amount required for blur correction of the object image on the image pickup element 8 (step 219). In this process, the optical blur correction amount is decreased with time, and the electrical blur correction amount is increased so as to fill the changing deficit of the optical blur correction amount accordingly. At the time when the optical blur correction amount becomes 0, the operation of the optical blur correction unit 5 is stopped (step 220), and the process returns to step 206.

On the other hand, if the image pickup start switch 21 is operated within the predetermined time, the camera microcomputer 17 controls the image pickup element 8 and drives the shutter (not shown) and other portions to effect the image pickup operation (step 231). In doing so, based on the result of the aforementioned voltage test (i.e. step 208), when the voltage of the battery 15 is higher than the first reference value sufficient for performing the optical blur correction operation, blur correction realizing higher image quality is effected by the optical blur correction during the image pickup operation.

After completion of the image pickup operation, an image signal is recorded in the image recording portion 12, and the image corresponding to the image signal is displayed on the image display portion 14 by means of the display control portion 13 (step 232). Then, the process returns to step 202. Thus, it is possible to check the effect of the blur correction operation just after the shooting.

If it is determined in step 212 that YNOW<YINIT, it is determined that the optical blur correction is not necessary and a series of blur correction operations is to be performed by the electrical blur correction. Thus, the process is in a waiting state for a predetermined time until the image pickup start switch 21 is operated (step 222). If the image pickup start switch 21 is not operated within the predetermined time period, the process returns to step 206. On the other hand, if the image pickup start switch 21 is operated within the predetermined time period, the process of step 231 and step 232 is executed.

If the voltage of the battery 15 is lower than the first reference value in step 208, it is checked whether or not the voltage of the battery 15 is lower than a second reference value, which represents the minimum value required for performing the optical blur correction (step 221). If the voltage of the battery 15 is lower than the second reference value, since the optical blur correction cannot be performed, it is determined that a series of blur correction operations is to be performed by the electrical blur correction, and the process is in a waiting state for a predetermined time until the image pickup start switch 21 is operated (step 222). If the image pickup start switch 21 is not operated within the predetermined time period, the process returns to step 206. On the other hand, if the image pickup start switch 21 is operated within the predetermined time period, the process of step 231 and step 232 is executed.

Next, the process executed in the case that the voltage of the battery 15 is higher than or equal to the second reference value in step 221 will be described. This case corresponds to the situation that the battery has been consumed to some extent but the optical blur correction is still possible.

In this case, the current focal length (fNOW) of the image pickup lens 3 is firstly detected by the focal length detection means (step 223).

Next, the aforementioned current focal length (fNOW) and a predetermined focal length (fINIT) are compared to make determination as to whether the current focal length (fNOW) is in the wide angle side (i.e. the longer focal length side) or in the telephoto side (i.e. the shorter focal length side) of the predetermined focal length (fINIT) (step 224). If, for example, fNOW<fINIT, namely if it is determined that the current focal length (fNOW) is in the wide angle side of the predetermined focal length (fINT), the value of the high frequency component of the current image signal (YNOW) is extracted by the high frequency component detection means (step 225).

Then, the value of the high frequency component in the current image signal (YNOW) is compared with a predetermined threshold value (YINIT) (step 226). If it is determined YNOW≧YINIT, the process proceeds to step 227. In addition, in the case that it is determined in step 224 that fNOW≧fINI, namely, in the case that it is determined that the current focal length (fNOW) is in the telephoto side of the predetermined focal length (fINIT), the process also proceeds to step 227.

Next, in the optical blur correction operation, the angular velocity sensor 23 that requires a significant detection preparation time and the integral process portion 24 are firstly operated to start only detection of the vibration in the vertical and horizontal directions occurring in the lens body 1 and the camera body 2 (step 227). Then, the process is in a waiting state for a predetermined time until the image pickup start switch 21 is operated (step 228). If the image pickup start switch 21 is not operated within the predetermined time, the process returns to step 206.

On the other hand, if the image pickup start switch 21 is operated within the predetermined time, the electrical blur correction operation is stopped (step 229). Simultaneously, the optical axis correction element 25 is driven by means of the drive portion 26 to drive the optical axis of the image pickup lens 3 in the vertical and horizontal directions, thereby correcting blur of the object image on the image pickup element 8 (step 230). After that, the process of step 231 and step 232 is executed.

As per the above, by activating only the minimum required vibration detection operation in the image pickup preparation stage, power consumption can be reduced and when the image pickup is started, the image pickup operation with the optical blur correction can be effected promptly. In this case, the electrical blur correction operation is stopped and the optical blur correction operation is started after the image pickup start switch 21 is operated, which is a situation in which framing is not to be performed. Therefore, shift of the electrical blur correction amount before stopping the electrical blur correction operation is not effected.

If it is determined in step 226 that YNOW<YINIT, it is determined that the optical blur correction is not necessary and a series of blur correction operations is to be performed by the electrical blur correction. Thus, the process is in a waiting state for a predetermined time until the image pickup start switch 21 is operated (step 222). If the image pickup start switch 21 is not operated within the predetermined time period, the process returns to step 206.

On the other hand, if the image pickup start switch 21 is operated within the predetermined time period, the process of step 231 and step 232 is executed.

As per the above, in this embodiment, when the image recording portion 12 does not record the image signal output from the signal processing portion 10, the image signal corrected by the electrical blur correction unit 11 is displayed on the image display portion 14, and when the image recording portion 12 records the image signal output from the signal processing portion 10, and the focal length is in the telephoto side of a predetermined focal length, or the high frequency component in the image signal is larger than a predetermined value, the image signal obtained by correcting the optical axis of the image pickup lens 3 by the optical axis correction element 25 is recorded by the image recording portion 12.

Furthermore, in this embodiment, there is provided a state (the third state) in which both the first blur correction means (object image blur correction by image signal processing) for the time when the image pickup operation is not effected (i.e. when the image is only observed through the finder) and the second blur correction means (object image blur correction by optical means) for the time when the image pickup operation is effected are operated simultaneously for blur correction, and the ratio of the respective blur correction amounts is changed with time by the control means (i.e. the camera microcomputer 17 and the lens microcomputer 6). With this feature, in the time when the object is not photographed but only observed, the electrical blur correction in which power consumption is small can be performed, and in the time when image pickup is effected, the optical blur correction with which an image with higher image quality can be produced can be performed. Furthermore, it is possible to eliminate disadvantages such as image skip at the time when the object image blur correction by image signal processing is switched to the object image blur correction by optical means and when the object image blur correction by optical means is switched to the object image blur correction by image signal processing.

Although in this embodiment, the focal length detected by the focal length detection means and the value of the high frequency component of the image detected by the high frequency component detection means are taken into consideration as conditions for selecting the second blur correction means (i.e. the optical blur correction unit) upon picking up image, but it is not essential, namely only either one of these condition may be employed.

Although the above description of the first and second embodiments has been directed to a camera system composed of a camera body and an interchangeable lens detachably mounted thereon, it is apparent that the same operations and effects can be realized even if the invention is applied to a camera system in which the camera body and the lens is integrally constructed.

According to the present invention, there is provided a state (the third state) in which both the first blur correction means (object image blur correction by image signal processing) for the time when the image pickup operation is not effected and the second blur correction means (object image blur correction by optical means) for the time when the image pickup operation is effected are operated simultaneously for blur correction, and the ratio of the respective blur correction amounts is changed with time. With this feature, it is possible to provide a lens, a camera body and a camera system in which disadvantages such as image skip at the time when the object image blur correction by image signal processing is switched to the object image blur correction by optical means and when the object image blur correction by optical means is switched to the object image blur correction by image signal processing can be eliminated.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-022744 filed on Jan. 30, 2004, which is hereby incorporated by reference herein.

What is claimed is:

1. A camera system comprising:
    a recording portion for recording an object image;
    a display portion for displaying the object image;
    a first blur correction portion for correcting blur of the object image displayed on the display portion by signal processing;
    a second blur correction portion for optically correcting blur of the object image recorded by the recording portion; and
    a controller for switching between a first blur correction mode in which the first blur correction portion is operated, a second blur correction mode in which the second blur correction portion is operated and a third blur correction mode in which both the first blur correction portion and the second blur correction portion are operated;
    wherein the third blur correction mode occurs between the first blur correction mode and the second blur correction mode,
    and the controller switches the blur correction mode between the first blur correction mode and the second blur correction mode, with changing the ratio of a first blur correction amount by the first blur correction portion and a second blur correction amount by the second blur correction portion with time in the third blur correction mode.

2. A camera system according to claim 1, further comprising a discrimination portion for discriminating between the state in which the display portion displays the object image but recording portion does not record the object image and the state in which the recording portion records the object image, wherein the controller switches to either one of the blur correction modes based on the result of discrimination by the discrimination portion.

3. A camera system according to claim 1, further comprising a focal length detection portion for detecting the focal length of an image pickup optical system for picking up the object image, wherein the controller switches to either one of the blur correction modes based on the focal length detected by the focal length detection portion.

4. A camera system according to claim 1, further comprising a high frequency component extraction means for extracting a high frequency component in an image signal subjected to the image processing, wherein the controller switches to either one of the blur correction modes based on the value of the high frequency component extracted by the high frequency component extraction means.

5. A camera system according to claim 1, further comprising:
    a discrimination portion for discriminating between the state in which the display portion displays the object image but recording portion does not record the object image and the state in which the recording portion records the object image;
    a focal length detection portion for detecting the focal length of an image pickup optical system for picking up the object image; and
    a high frequency component extraction means for extracting a high frequency component in an image signal subjected to the image processing, wherein the controller switches either one of the blur correction modes based on at least two of the result of discrimination by the discrimination portion, the focal length detected by the focal length detection portion and the value of the high frequency component extracted by the high frequency component extraction means.

6. A camera system according to claim 1, wherein at the time of switching the blur correction mode from the first blur correction mode to the second blur correction mode, the ratio is changed such a way that the first blur correction amount by the first blur correction portion changes smaller than the second blur correction amount by the second blur correction portion with time in the third blur correction mode, and at the time of switching the blur correction mode from the second blur correction mode to the first blur correction mode, the ratio is changed such a way that the second blur correction amount by the second blur correction portion changes smaller than the first blur correction amount by the first blur correction portion with time in the third blur correction mode.

7. A lens that can be detachably mounted on a camera body having a recording portion for recording an object image, a display portion for displaying the object image, a first blur correction portion for correcting blur of the object image displayed on the display portion by signal processing and a camera controller, the lens comprising:

a second blur correction portion for optically correcting blur of the object image recorded by the recording portion; and a lens controller, wherein the camera controller can set either one of a first blur correction mode in which the first blur correction portion is operated, a second blur correction mode in which the second blur correction portion is operated and a third blur correction mode in which both the first blur correction portion and the second blur correction portion are operated; and the lens controller drives the second blur correction portion based on a signal from the camera controller;

wherein the third blur correction mode occurs between the first blur correction mode and the second blur correction mode, and the controller switches the blur correction mode between the first blur correction mode and the second blur correction mode, with driving the second blur correction portion in such a way as to change the ratio of a first blur correction amount by the first blur correction portion and a second blur correction amount by the second blur correction portion with time in the third blur correction mode.

8. A lens according to claim 7, wherein at the time of switching the blur correction mode from the first blur correction mode to the second blur correction mode, the ratio is changed such a way that the first blur correction amount by the first blur correction portion changes smaller than the second blur correction amount by the second blur correction portion with time in the third blur correction mode, and at the time of switching the blur correction mode from the second blur correction mode to the first blur correction mode, the ratio is changed such a way that the second blur correction amount by the second blur correction portion changes smaller than the first blur correction amount by the first blur correction portion with time in the third blur correction mode.

9. A camera body on which a lens can be detachably mounted, comprising:

a recording portion for recording an object image;

a display portion for displaying the object image;

a first blur correction portion for correcting blur of the object image displayed on the display portion by signal processing; and a controller for switching between a first blur correction mode in which the first blur correction portion is operated, a second blur correction mode in which a second blur correction portion provided in the lens for optically correcting blur of the object image recorded by the recording portion is operated and a third blur correction mode in which both the first blur correction portion and the second blur correction portion are operated;

wherein the third blur correction mode occurs between the first blur correction mode and the second blur correction mode, and the controller switches the blur correction mode between the first blur correction mode and the second blur correction mode, with changing the ratio of a first blur correction amount by the first blur correction portion and a second blur correction amount by the second blur correction portion with time in the third blur correction mode.

10. A camera body according to claim 9, wherein at the time of switching the blur correction mode from the first blur correction mode to the second blur correction mode, the ratio is changed such a way that the first blur correction amount by the first blur correction portion changes smaller than the second blur correction amount by the second blur correction portion with time in the third blur correction mode, and at the time of switching the blur correction mode from the second blur correction mode to the first blur correction mode, the ratio is changed such a way that the second blur correction amount by the second blur correction portion changes smaller than the first blur correction amount by the first blur correction portion with time in the third blur correction mode.

* * * * *